(12) United States Patent
Ogata

(10) Patent No.: US 11,961,395 B2
(45) Date of Patent: Apr. 16, 2024

(54) DRIVING ASSISTANCE DEVICE, DRIVING ASSISTANCE METHOD, AND STORAGE MEDIUM IN WHICH PROGRAM IS STORED

(71) Applicant: NEC Corporation, Tokyo (JP)

(72) Inventor: Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 396 days.

(21) Appl. No.: 17/311,481

(22) PCT Filed: Dec. 12, 2019

(86) PCT No.: PCT/JP2019/048688
§ 371 (c)(1),
(2) Date: Jun. 7, 2021

(87) PCT Pub. No.: WO2020/122175
PCT Pub. Date: Jun. 18, 2020

(65) Prior Publication Data
US 2022/0020270 A1 Jan. 20, 2022

(30) Foreign Application Priority Data
Dec. 12, 2018 (JP) .................. 2018-232877

(51) Int. Cl.
*G08G 1/04* (2006.01)
*G06V 20/56* (2022.01)
(Continued)

(52) U.S. Cl.
CPC ............ *G08G 1/04* (2013.01); *G06V 20/56* (2022.01); *G06V 20/597* (2022.01); *G10L 25/51* (2013.01)

(58) Field of Classification Search
CPC ............ B60W 50/14; B60W 2540/22; B60W 2540/221; B60W 40/09;
(Continued)

(56) References Cited

U.S. PATENT DOCUMENTS 9,063,543 B2 * 6/2015 An .................. B60W 50/08
10,875,536 B2 * 12/2020 Fung .................. B62D 6/007
(Continued)

FOREIGN PATENT DOCUMENTS

| JP | 2008-062852 A | 3/2008 |
| JP | 2009-128486 A | 6/2009 |

(Continued)

OTHER PUBLICATIONS

Arief et al., "Recent Trends in Driver Safety Monitoring Systems: State of the Art and Challenges" (Year: 2017).*

(Continued)

*Primary Examiner* — Dung Hong
(74) *Attorney, Agent, or Firm* — Sughrue Mion, PLLC

(57) ABSTRACT

A driving assistance device includes first acquisition means for acquiring driving status sensing data of a vehicle from a driving status sensing device provided in the vehicle, second acquisition means for acquiring biological information regarding a biological change of a driver of the vehicle, and determination means for determining occurrence of a dangerous event on the basis of a first occurrence index value for a dangerous event that is a value corresponding to the driving status sensing data and a second occurrence index value that is a value corresponding to the biological information of the driver.

9 Claims, 7 Drawing Sheets

(51) Int. Cl.
*G06V 20/59* (2022.01)
*G10L 25/51* (2013.01)

(58) Field of Classification Search
CPC ......... B60W 2040/0872; G06V 40/168; G06V 20/597; G06V 20/56; G08G 1/04; G10L 25/51
See application file for complete search history.

(56) References Cited

U.S. PATENT DOCUMENTS

| | | | | |
|---|---|---|---|---|
| 2013/0297097 | A1* | 11/2013 | Fischer | G06F 17/00 |
| | | | | 701/1 |
| 2019/0184998 | A1* | 6/2019 | Zheng | B60W 60/007 |
| 2019/0185014 | A1* | 6/2019 | Choo | G05D 1/0061 |
| 2019/0213429 | A1* | 7/2019 | Sicconi | G06F 3/012 |
| 2019/0276036 | A1* | 9/2019 | Noguchi | B60W 30/18 |
| 2019/0337533 | A1* | 11/2019 | Kume | B60W 50/14 |
| 2020/0094737 | A1* | 3/2020 | Furukawa | B60W 30/0956 |
| 2020/0155054 | A1* | 5/2020 | Slater | A61B 5/08 |
| 2020/0262442 | A1* | 8/2020 | Naito | G08B 29/20 |
| 2023/0012298 | A1* | 1/2023 | Saban | G06Q 40/08 |

FOREIGN PATENT DOCUMENTS

| | | | |
|---|---|---|---|
| JP | 2009128486 A | * | 6/2009 |
| JP | 2018-049477 A | | 3/2018 |
| JP | 2018-147021 A | | 9/2018 |

OTHER PUBLICATIONS

International Search Report for PCT Application No. PCT/JP2019/048688, dated Mar. 3, 2020.

Japanese Office Action for JP Application No. 2020-559311, dated Dec. 6, 2022 with English Translation.

* cited by examiner

DRIVING ASSISTANCE DEVICE, DRIVING ASSISTANCE METHOD, AND STORAGE MEDIUM IN WHICH PROGRAM IS STORED

This application is a National Stage Entry of PCT/JP2019/048688 filed on Dec. 12, 2019, which claims priority from Japanese Patent Application 2018-232877 filed on Dec. 12, 2018 the contents of all of which are incorporated herein by reference, in their entirety.

TECHNICAL FIELD

The present invention relates to a driving assistance device, a driving assistance method, and a storage medium in which a program is stored.

BACKGROUND ART

There is a method of assisting with safe driving by acquiring acceleration information of a moving object such as a vehicle, determining that a dangerous event (an event that may lead to an accident) has occurred in a case where sudden steering or sudden braking is detected, and giving feedback on the event to a driver.

Patent Document 1 discloses a technique for predicting a dangerous state of a driver who is driving a moving object such as a vehicle.

Patent Document 1 discloses a technique in which an action of a monitored person indicating a driver is monitored, and an action that coincides with a sign action indicating a sign of transition to a dangerous state and is performed by the monitored person is detected. Patent Document 1 discloses that the sign actions are a state of cognitive decline, a state of drowsiness, a state of drunkenness, a state of head movement, a change of facial expression, a change of gaze movement, and the like of the monitored person.

CITATION LIST

Patent Literature

[Patent Document 1]
Japanese Unexamined Patent Application, First Publication No. 2018-147021

SUMMARY OF THE INVENTION

Problems to be Solved by the Invention

Meanwhile, there are various types of dangerous events when a moving object is being driven, and it is desirable to detect an occurrence of the various types of dangerous events with safe driving assistance.

Therefore, an example object of the present invention is to provide a driving assistance device, a driving assistance method, and a storage medium in which a program is stored, capable of solving the above problems.

Means for Solving the Problems

According to a first aspect of the invention, there is provided a driving assistance device including first acquisition means for acquiring driving status sensing data of a vehicle from a driving status sensing device provided in the vehicle; second acquisition means for acquiring biological information regarding a biological change of a driver of the vehicle; and determination means for determining occurrence of a dangerous event on the basis of a first occurrence index value for a dangerous event that is a value corresponding to the driving status sensing data and a second occurrence index value that is a value corresponding to the biological information of the driver.

According to a second aspect of the invention, there is provided a driving assistance method including acquiring driving status sensing data of a vehicle from a driving status sensing device provided in the vehicle; acquiring biological information regarding a biological change of a driver of the vehicle; and determining occurrence of a dangerous event on the basis of a first occurrence index value for a dangerous event that is a value corresponding to the driving status sensing data and a second occurrence index value that is a value corresponding to the biological information of the driver.

According to a third aspect of the invention, there is provided a storage medium storing a program causing a computer of a driving assistance device to execute processes of acquiring driving status sensing data of a vehicle from a driving status sensing device provided in the vehicle; acquiring biological information regarding a biological change of a driver of the vehicle; and determining occurrence of a dangerous event on the basis of a first occurrence index value for a dangerous event that is a value corresponding to the driving status sensing data and a second occurrence index value that is a value corresponding to the biological information of the driver.

Advantageous Effects of Invention

According to the present invention, it is passible to detect the occurrence of various types of dangerous events.

EXAMPLE EMBODIMENT

Hereinafter, a driving assistance device according to an embodiment of the present invention will be described with reference to the drawings.

Figure 1:
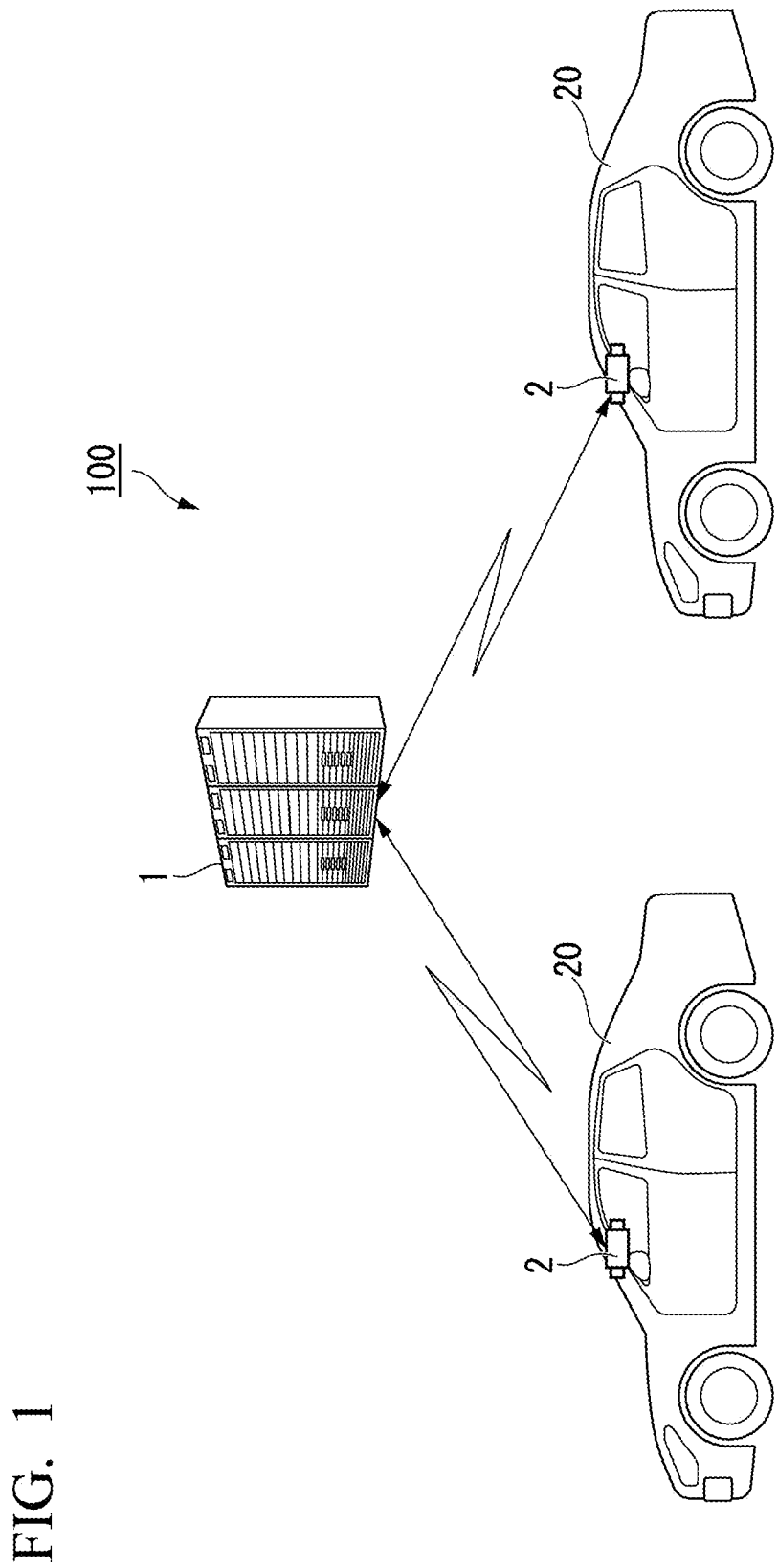
FIG. 1 is a diagram illustrating an outline of a driving assistance system according to the present embodiment.

FIG. 1 is a diagram illustrating an outline of a driving assistance system including a driving assistance device according to the present embodiment.

As illustrated in FIG. 1, a driving assistance system 100 has a configuration in which a driving assistance device 1 and a drive recorder 2 are connected to each other via a wireless communication network or a wired communication network. The driving assistance device 1 is, for example, a computer server of a company which performs driving assistance, and is a computer server (cloud server) that is connected to a communication network. The drive recorder 2 is provided in each of a plurality of moving objects. FIG. 1 illustrates a vehicle 20 as an example of the moving object. The drive recorder 2 has a camera, and transmits captured images of the inside and the outside of the vehicle 20 to the driving assistance device 1. The drive recorder 2 is a type of driving status sensing device. The drive recorder 2 is also a type of driver sensing device.

Figure 2:
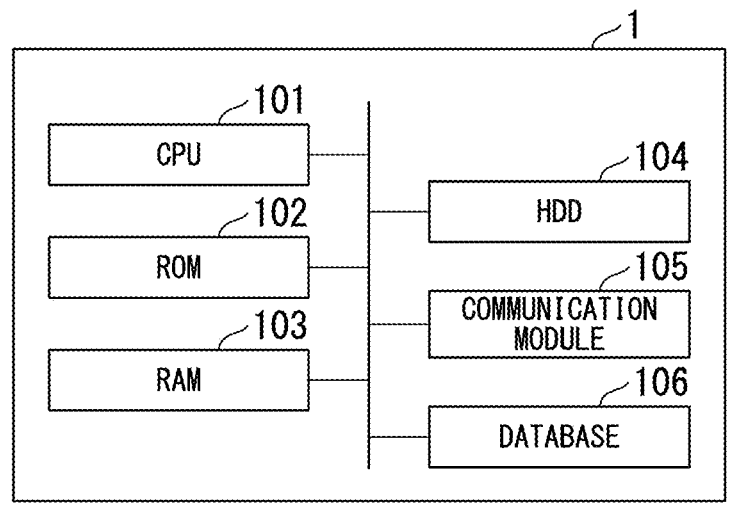
FIG. 2 is a hardware configuration diagram of a driving assistance device according to the present embodiment.

FIG. 2 is a hardware configuration diagram of the driving assistance device.

As illustrated in FIG. 2, the driving assistance device 1 is a computer including hardware such as a central processing unit (CPU) 101, a read only memory (ROM) 102, a random access memory (RAM) 103, a hard disk drive (HDD) 104, a communication module 105, and a database 106.

Figure 3:
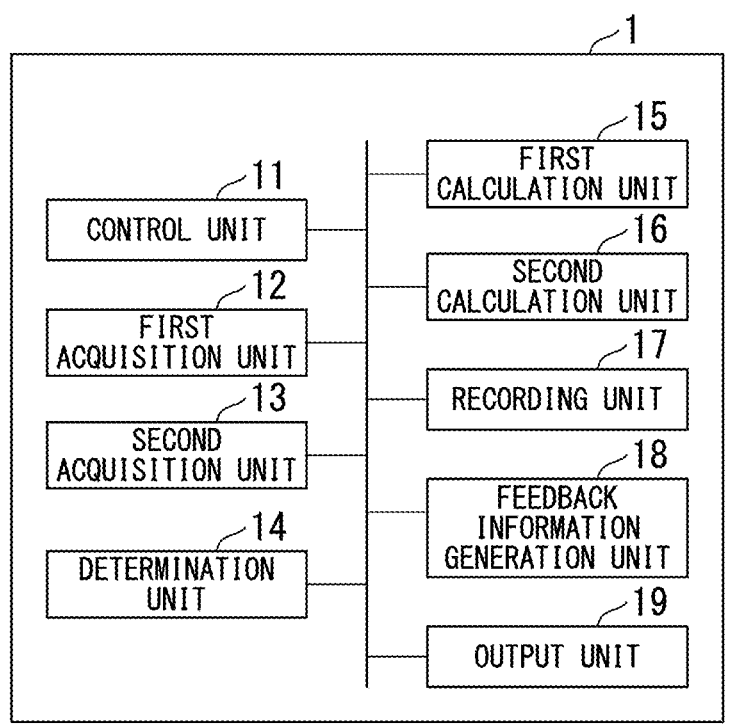
FIG. 3 is a functional block diagram of the driving assistance device according to the present embodiment.

FIG. 3 is a functional block diagram of the driving assistance device.

When power is supplied, the driving assistance device 1 is activated to execute a driving assistance program that is stored in advance. Consequently, the driving assistance device 1 includes at least a control unit 11, a first acquisition unit 12, a second acquisition unit 13, a determination unit 14, a first calculation unit 15, a second calculation unit 16, a recording unit 17, a feedback information generation unit 18, and an output unit 19.

The control unit 11 controls other functional units of the driving assistance device 1.

The first acquisition unit 12 acquires sensing data regarding a driving status of the vehicle 20 from a driving status sensing device such as the drive recorder 2 provided in the vehicle 20.

The second acquisition unit 13 acquires biological information of a driver of the vehicle 20 from a driving status sensing device such as the drive recorder 2.

In a case where a dangerous event occurrence index value (first occurrence index value) included in dangerous event data is equal to or greater than a predetermined threshold value, the determination unit 14 determines that a dangerous event has occurred. Here, the dangerous event is, for example, an event that may lead to an accident. The dangerous event data is data generated by the drive recorder 2 when an event that may lead to an accident has occurred. The dangerous event data includes an acceleration, a speed, a steering wheel rotation angle, a brake stepping amount, an event occurrence time, vehicle position information (latitude information and longitude information) of the vehicle when the occurrence of the event is detected, an ID of the drive recorder 2, and a driver ID.

Even when the dangerous event occurrence index value included in the dangerous event data is smaller than the predetermined threshold value, in a case where a dangerous event occurrence index value (second occurrence index value) that is calculated on the basis of biological information regarding a biological change of the driver is equal to or greater than a predetermined threshold value, the determination unit 14 determines that a dangerous event has occurred.

In a case where a dangerous event occurrence index value (first occurrence index value) that is calculated on the basis of driving status sensing data (driving status data) is equal to or greater than a predetermined threshold value, the determination unit 14 determines that a dangerous event has occurred. The driving status data includes, for example, vehicle information, position information (latitude information and longitude information), an acceleration, a speed, a steering wheel rotation angle, a brake stepping amount, a generation time of the driving status data, the ID of the drive recorder 2, and the driver ID.

Even when the dangerous event occurrence index value that is calculated on the basis of driving status sensing data is smaller than a predetermined threshold value, in a case where a dangerous event occurrence index value (second occurrence index value) that is calculated on the basis of biological information regarding a biological change of the driver is equal to or greater than a predetermined threshold value, the determination unit 14 determines that a dangerous event has occurred.

In a case where the biological information is a face image obtained by imaging the driver's face, the first calculation unit 15 calculates the dangerous event occurrence index value on the basis of the face image.

In a case where the biological information is an utterance of the driver, the second calculation unit 16 calculates the dangerous event occurrence index value on the basis of the utterance.

The number of dangerous event occurrence index values may be one or plural. In a case where a plurality of occurrence index values are used, for example, an average value of the plurality of occurrence index values may be used, or an occurrence index value with high priority may be weighted and a plurality of the weighted occurrence index values may be used.

In a case where it is determined that the dangerous event has occurred, the recording unit 17 records dangerous event occurrence factor information. In other words, the recording unit 17 records occurrence factor information indicating either that the dangerous event is determined as having occurred because an occurrence index value based on the driving status sensing data is equal to or greater than a predetermined threshold value, or that the dangerous event is determined as having occurred because an occurrence index value based on the biological information is equal to or greater than a predetermined threshold value.

The feedback information generation unit 18 generates feedback information including at least identification information of the driver and the occurrence factor information.

The output unit 19 outputs the feedback information to a predetermined output destination device.

Even when the dangerous event occurrence index value is smaller than the predetermined threshold value, in a case where a dangerous event occurrence index value that is calculated on the basis of biological information regarding a biological change of the driver is equal to or greater than a predetermined threshold value, the driving assistance device 1 having the respective functional units described above, determines and records that a dangerous event has occurred.

Consequently, it is possible to detect the occurrence of various types of dangerous events. It is possible to record information regarding the occurrence of the dangerous events. More specifically, it is possible to detect chronic rough driving (driving that the driver is unaware of and that makes the driver a candidate driving dangerously) and record information regarding the driving.

Figure 4:
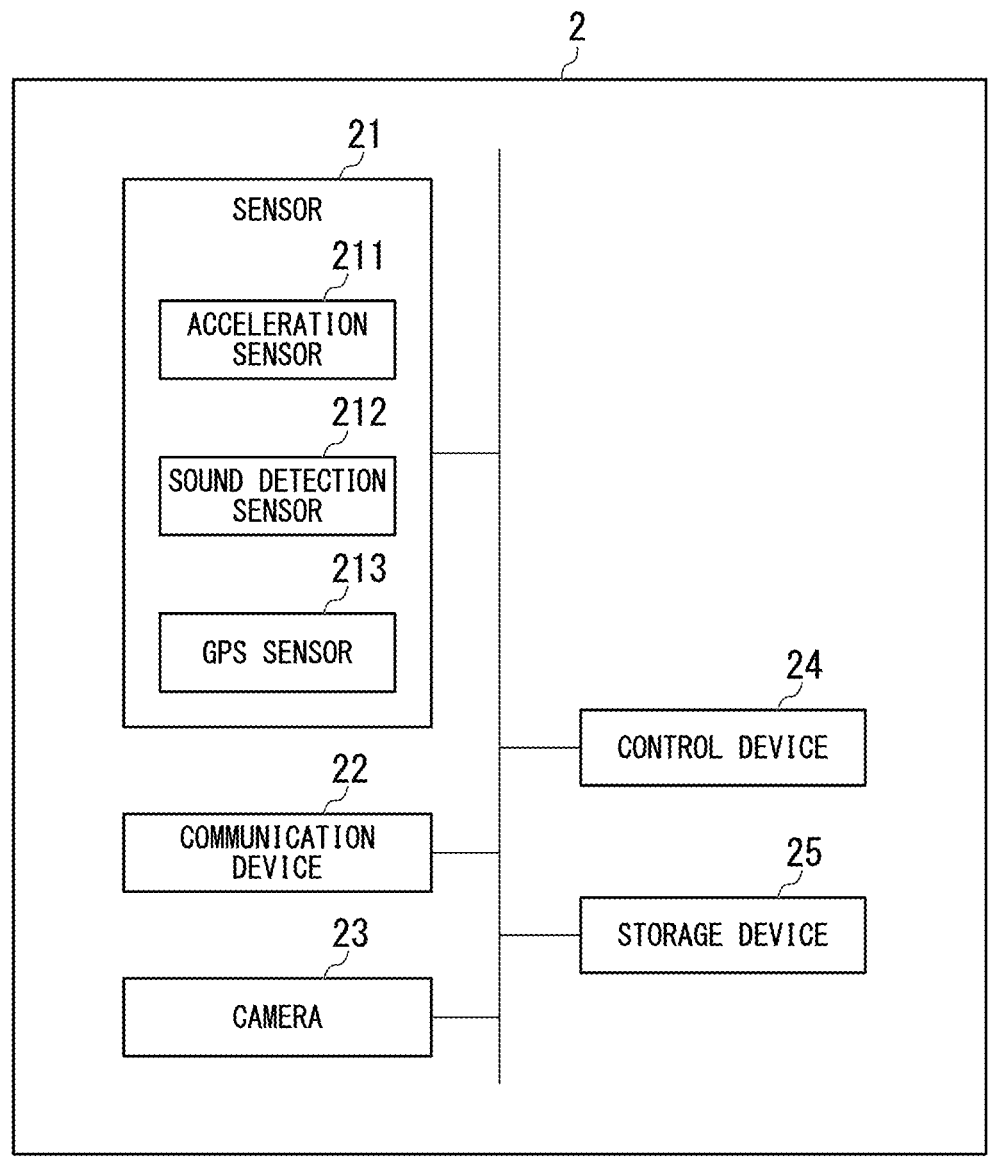
FIG. 4 is a diagram illustrating a hardware configuration of a drive recorder according to the present embodiment.

FIG. 4 is a diagram illustrating a hardware configuration of the drive recorder.

The drive recorder 2 is configured to include a sensor 21, a communication device 22, a camera 23, a control device 24, a storage device 25, and the like. In the present embodiment, for example, the sensor 21 includes a plurality of sensors. The sensor 21 may include an acceleration sensor 211, a sound detection sensor 212, a GPS sensor 213, and the like. The sensor 21 may be provided at any position in the vehicle outside the drive recorder 2, and the drive recorder 2 may acquire information sensed by the sensor 21. In the present embodiment, a case where the sensor 21 includes the acceleration sensor 211, the sound detection sensor 212, and the GPS sensor 213 has been exemplified, but the present invention is not limited thereto.

The communication device 22 is communicably connected to the driving assistance device 1.

The camera 23 includes an outside imaging lens (not illustrated) and an inside imaging lens (not illustrated). The outside imaging lens has a predetermined angle of view centered on an advancing direction of the vehicle 20. The inside imaging lens has a predetermined angle of view centered on a direction in which the driver's face can be imaged when the driver is seated in a driver's seat. Consequently, the camera 23 of the drive recorder 2 can generate a captured image of the from of the vehicle and a captured image of the driver's face in the vehicle.

The control device 24 controls each function provided in the drive recorder 2.

The storage device 25 stores sensing information including at least one of a moving image and a still image, and various information sensed by the sensor 21.

The drive recorder 2 is communicably connected to the driving assistance device 1 via a base station or the like. The control device 24 of the drive recorder 2 is a computer including a CPU, a ROM, and a RAM.

Figure 5:
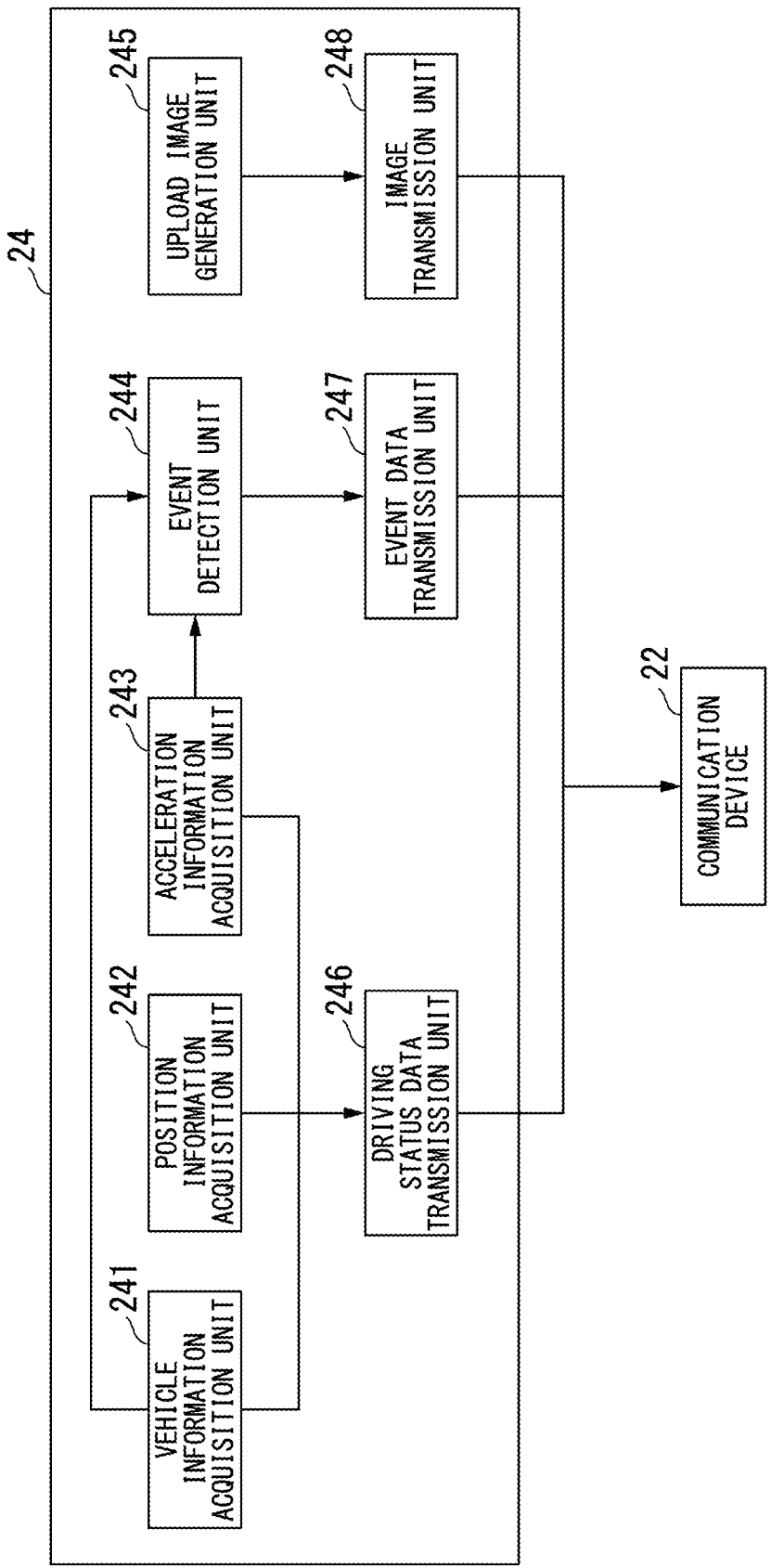
FIG. 5 is a functional block diagram of a control device of the drive recorder according to the present embodiment.

FIG. 5 is a functional block diagram of the control device of the drive recorder.

When the drive recorder 2 is activated, the CPU of the control device 24 executes a control program stored in the memory or the like. Consequently, the control device 24 includes respective functional units such as a vehicle information acquisition unit 241, a position information acquisition unit 242, an acceleration information acquisition unit 243, an event detection unit 244, an upload image generation unit 245, a driving status data transmission unit 246, an event data transmission unit 247, and an image transmission unit 248.

The vehicle information acquisition unit 241 acquires vehicle information including information (a driver ID, a vehicle type, and a vehicle ID) regarding the vehicle 20 that is recorded on a storage unit such as a memory built into the drive recorder 2 or a memory built into the drive recorder 2 in advance. The vehicle information that is acquired by the vehicle information acquisition unit 241 may further include information such as a driving start time, a driving stop time, a vehicle speed corresponding to a time, a temperature in the vehicle, a steering wheel angle, and a brake stepping amount.

The position information acquisition unit 242 acquires information including position information (latitude information and longitude information) of the vehicle corresponding to a time from the GPS sensor 213 (FIG. 4) or the like.

The acceleration information acquisition unit 243 acquires acceleration information of the vehicle corresponding to a time from the acceleration sensor 211 (FIG. 4).

The event detection unit 244 determines whether or not a predetermined dangerous event has occurred on the basis of the acceleration. Here, the predetermined dangerous event is, for example, an event that may lead to an accident.

The upload image generation unit 245 acquires image data including at least one of a moving image and a still image from the camera 23 through imaging performed by the camera 23, and generates and outputs a captured image for upload at a predetermined time interval on the basis of the image data. The upload image generation unit 245 generates a captured image at a generation speed of 1 frame per second (fps) as an example. In other words, the upload image generation unit 245 generates one captured image per second. When it is detected by the event detection unit 244 that a dangerous event has occurred, the upload image generation unit 245 may generate a captured image at a generation speed such as 30 fps in a period including at least a predetermined time before the occurrence of the dangerous event.

The driving status data transmission unit 246 transmits the driving status data including the vehicle information, the position information (latitude information and longitude information), the acceleration, the speed, the steering wheel rotation angle, the brake stepping amount, the generation time of the driving status data, the ID of the drive recorder 2, and the driver ID to the driving assistance device 1.

In a case where the occurrence of a dangerous event is detected by the event detection unit 244, the event data transmission unit 247 may transmit dangerous event data. The dangerous event data may include an acceleration, a speed, a steering wheel rotation angle, a brake stepping amount, an event occurrence time, vehicle position information (latitude information and longitude information) when the occurrence of the event is detected, the ID of the drive recorder 2, and the driver ID. The dangerous event data may further include other sensing information. The dangerous event data may include an identifier indicating the type of event.

The image transmission unit 248 transmits a captured image generated by the upload image generation unit 245 to the driving assistance device 1.

The control device 24 may not include the event detection unit 244 or the event data transmission unit 247. In this case, the driving assistance device 1 has a function corresponding to the event detection unit 244. The control device 24 and the driving assistance device 1 may have the function corresponding to the event detection unit 244. In this case, the event detection unit 244 provided in the control device 24 may detect the occurrence of a dangerous event on the basis of sensing data, and the driving assistance device 1 may analyze the occurrence of the dangerous event in more detail to determine whether or not the determination of the occurrence of the dangerous event is correct. In a case where the function of the event detection unit 244 is provided in only the driving assistance device 1, the driving status data transmission unit 246 of the control device 24 may transmit driving status data to the driving assistance device 1 via the communication device 22 at ail times.

Figure 6:
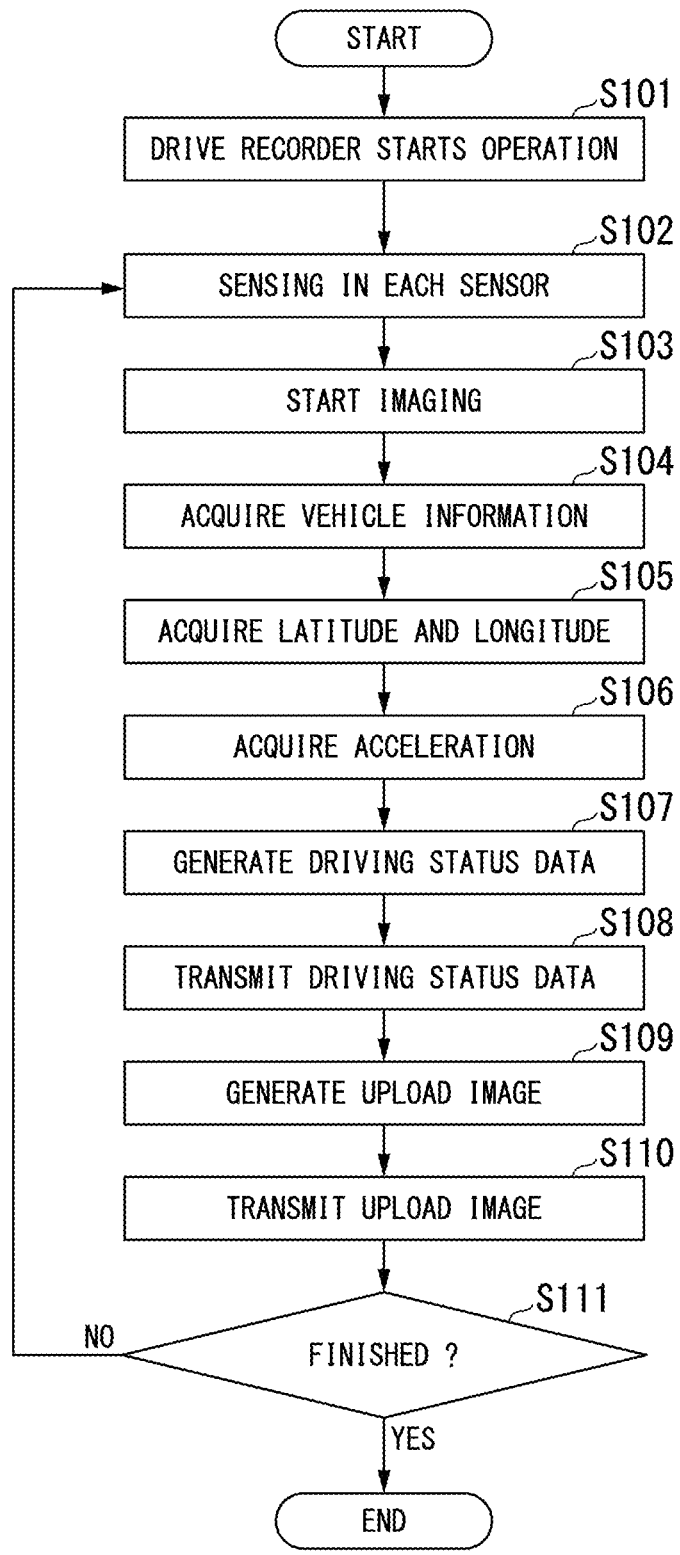
FIG. 6 is a first diagram illustrating a process flow in the drive recorder according to the present embodiment.

FIG. 6 is a first diagram illustrating a process flow in the drive recorder.

Next, the process flow in the drive recorder 2 will be described in order with reference to FIG. 6.

First, a driving status data transmission process in the drive recorder 2 will be described.

When an electric system of the vehicle is activated, the drive recorder 2 starts an operation (step S101). Each sensor 21 of the drive recorder 2 starts various types of sensing after the drive recorder 2 is started (step S102). The camera 23 starts imaging (step S103). The vehicle information acquisition unit 241 of the control device 24 acquires vehicle information during the operation of the drive recorder 2 (step S104).

The position information acquisition unit 242 acquires position information (latitude information and longitude information) from the GPS sensor 213 at a predetermined time interval (step S105). The acceleration information acquisition unit 243 acquires acceleration information from the acceleration sensor 211 at the predetermined time interval (step S106). The predetermined time interval may be for example, 0.1 seconds.

The driving status data transmission unit 246 acquires the vehicle information, the position information (latitude information and longitude information), and the acceleration information respectively acquired in steps S104, S105, and S106, and generates driving status data including the information, a generation time of the driving status data, the ID of the drive recorder 2, and the driver ID (step S107). The driving status data transmission unit 246 may acquire information regarding sound inside and outside the vehicle from the sound detection sensor 212 and generate the driving status data including the information regarding sound.

The driving status data transmission unit 246 requests the communication device 22 to transmit the driving status data to the driving assistance device 1. The communication device 22 transmits the driving status data to the driving assistance device 1 (step S108).

On the other hand, the camera 23 outputs a first captured image obtained by imaging the front side of the vehicle 20, which is generated on the basis of incident light that is input to the outside imaging lens and a second captured image including the driver's face that is generated on the basis of incident light that is input to the inside imaging lens, to the control device 24. The upload image generation unit 245 of the control device 24 acquires the first captured image and the second captured image. The upload image generation unit 245 generates an upload image including the first captured image and the second captured image (step S109).

Specifically, the upload image generation unit 245 generates an upload image including the first captured image or the second captured image that is acquired from the camera 23 at a predetermined time interval. The first captured image or the second captured imago may be a still image or a moving image. The upload image generated by the upload image generation unit 245 includes a generation time thereof, the ID of the drive recorder 2, and the driver ID.

The image transmission unit 248 requests the communication device 22 to transmit the upload image to the driving assistance device 1. The communication device 22 transmits the upload image to the driving assistance device 1 (step S110). The control device 24 determines whether or not the process is finished (step S111), and repeatedly performs the process from step S102 to the process end.

Figure 7:
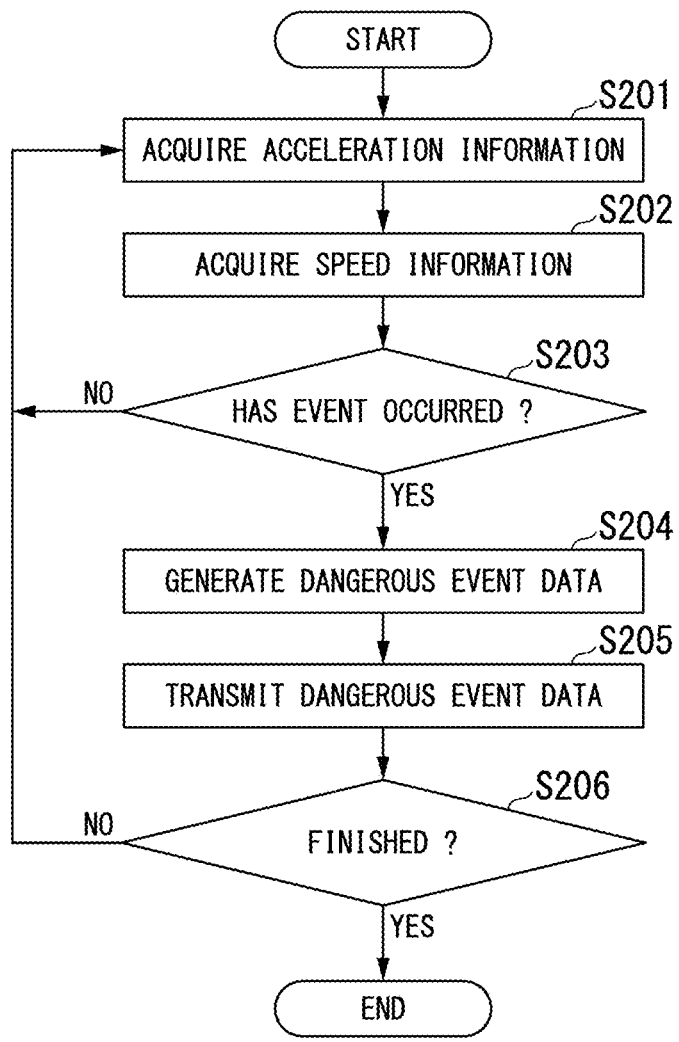
FIG. 7 is a second diagram illustrating a process flow in the drive recorder according to the present embodiment.

FIG. 7 is a second diagram illustrating a process flow in the drive recorder.

The drive recorder 2 performs an event detection process in parallel to a process of transmitting driving status data or an upload image. First, when the drive recorder 2 is started, the event detection unit 244 of the control dev ice 24 acquires acceleration information from the acceleration information acquisition unit 243 at a predetermined time interval (S201). The event detection unit 244 acquires speed information from the vehicle information acquisition unit 241 at a predetermined time interval (step S202).

The event detection unit 244 detects whether or not an event has occurred in the vehicle on the basis of temporal changes of the acceleration and the speed of the vehicle (step S203). The event is a dangerous event in the present embodiment. Detection of whether or not the event has occurred may be defined depending on the driver's attributes.

Specifically, the event detection unit 244 acquires operation condition data recorded in the storage device 24. The operation condition data is data indicating a condition for determining that a dangerous event has occurred. The operation condition data includes danger level information and dangerous driving type information. The danger level information is data in which a numerical value indicating the degree of danger such as danger level "1" danger level "2", danger level "3", . . . , and an acceleration used as a reference for determining corresponding danger are associated with each other. As the danger value becomes greater, the danger increases. The dangerous driving type information is a condition for determining the type of dangerous driving such as sudden start, sudden acceleration, sudden stop, and sudden deceleration, and is data indicating a direction of acceleration or a value of speed according to the type of dangerous driving.

As an example, in a case where an acceleration of the vehicle is an acceleration corresponding to the danger level "3" of the danger level information and an acceleration direction or a speed of the vehicle satisfies the condition for an acceleration direction or a speed indicated by any type of dangerous driving of the dangerous driving type information, the event detection unit 244 detects the occurrence of a dangerous event. The event detection unit 244 may detect the occurrence of a dangerous event in at least one of a case where an acceleration of the vehicle is an acceleration corresponding to predetermined danger and a case where an acceleration direction or a speed of the vehicle satisfies the condition for an acceleration direction or a speed corresponding to any type of dangerous driving indicated by the dangerous driving type information.

The danger level information or the dangerous driving type information is set according to the driver's attributes. Thus, it is possible to detect the occurrence of a dangerous event on the basis of the driver's attributes.

In a case where the occurrence of the dangerous event has been detected, the event detection unit 244 generates dangerous event data (step S204). The dangerous event data may include an acceleration, a speed, a steering wheel rotation angle, a brake stepping amount, a dangerous event occurrence time, vehicle position information (latitude information and longitude information) when the occurrence of the dangerous event is detected, the ID of the drive recorder 2, and the driver ID. The dangerous event data may include other sensing information.

The event data transmission unit 247 acquires the dangerous event data from the event detection unit 244. The event data transmission unit 247 instructs the communication device 22 to transmit the dangerous event data to the driving assistance device 1. The communication device 22 transmits the dangerous event data to the driving assistance device 1 (step S205). The control device 24 determines whether or not the process is finished (step S206), and repeatedly performs the process from step S201 to the process end.

In the present embodiment, the aspect in which the function of the event detection unit 244 is provided in the control device 24 has been described, but the function of the event detection unit 244 may not be provided in the control device 24. In this case, the function of the event detection unit 244 is provided in the driving assistance device 1, and the driving assistance device 1 detects the occurrence of a dangerous event on the basis of driving status data.

Figure 8:
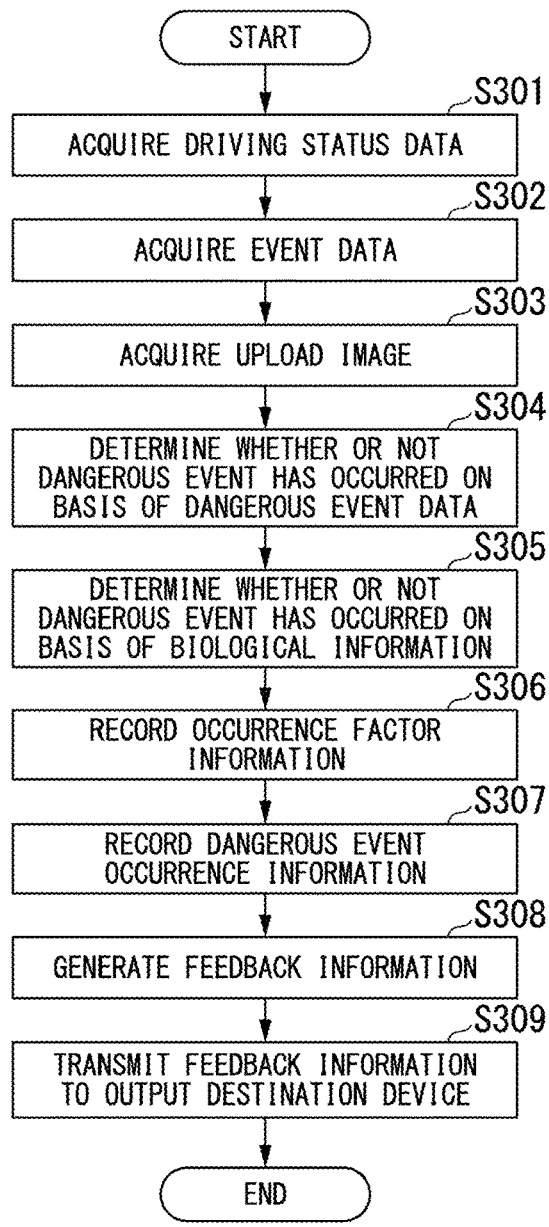
FIG. 8 is a diagram illustrating a process flow in the driving assistance device according to the present embodiment.

FIG. 8 is a diagram illustrating a process flow in the driving assistance device.

In the driving assistance device 1, the first acquisition unit 12 acquires the driving status data transmitted from the communication device 22 of the vehicle via the communication module 105 (step S301). The first acquisition unit 12 acquires the dangerous event data transmitted front the communication device 22 of the vehicle via the communication module 105 (step S302). The second acquisition unit 13 acquires the upload image transmitted from the communication device 22 of the vehicle via the communication module 105 (step S303).

The determination unit 14 acquires the driving status data and the dangerous event data acquired in steps S301 and S302. The determination unit 14 determines whether or not a dangerous event has occurred in the vehicle 20 on the basis of the dangerous event data or the driving status data (step S304). The determination unit 14 checks whether or not a dangerous event has occurred in the vehicle 20 on the basis of a dangerous event occurrence index value included in the dangerous event data.

Specifically, the determination unit 14 checks whether or not a dangerous event has occurred in the vehicle 20 on the basis of whether or not the occurrence index value is equal to or greater than a predetermined threshold value. In a case where the occurrence index value is an acceleration, the determination unit 14 determines whether or not the acceleration included in the dangerous event data is equal to or greater than a predetermined threshold value, and determines that a dangerous event has occurred in a case where the acceleration is equal to or greater than the threshold value. A process of determining whether or not a dangerous event has occurred on the basis of the driving status data is as described above.

Determination, performed by the driving assistance device 1, of whether or not a dangerous event has occurred based on the dangerous event data or the driving status data may be higher in accuracy titan detection of a dangerous event performed by the drive recorder 2. As described above, in a case where the control device 24 of the drive recorder 2 does not have the function of the event detection unit 244, the determination unit 14 may detect a dangerous event on rite basis of the driving status data through the same process as the process described above in the event detection unit 244. In a case where the occurrence of the dangerous event has been detected on the basis of the dangerous event data or the driving status data, the determination unit 14 outputs information indicating the occurrence of the dangerous event to the recording unit 17.

Even in a case where it is determined that a dangerous event has not occurred on the basis of the dangerous event data or the driving status data, the determination unit 14 determines whether or not a dangerous event has occurred on the basis of biological information regarding a biological change of the driver (step S305).

Specifically, the determination unit 14 instructs the first calculation unit 15 to calculate a dangerous event occurrence index value on the basis of the captured image. The first calculation unit 15 analyzes a facial condition (expression) of the driver in the second captured image included in the upload image, and calculates the dangerous event occurrence index value based on the facial condition of the driver.

The dangerous event occurrence index value based on the facial condition of the driver has a great value in a case where the facial condition indicates surprise, fear, or anger. The first calculation unit 15 determines the facial condition of the driver included in the second captured image, to calculate a value indicating the degree of surprise, the degree of fear, or the degree of anger, and sets the value as the dangerous event occurrence index value.

A method of calculating a value indicating the degree of surprise, the degree of fear, or the degree of anger on the basis of a facial condition of the driver included in the second captured image may be any method. As an example, the first calculation unit 15 inputs position information of the eyes, the mouth, and the eyebrows in the face image to a calculation model for the dangerous event occurrence index value, calculates the dangerous event occurrence index value indicating the degree of surprise, the degree of fear, or the degree of anger serving as an output value of the calculation model, and outputs the dangerous event occurrence index value to the determination unit 14. This calculation model for the dangerous event occurrence index value may be a calculation model obtained through machine learning with a face image representing surprise, a face image representing fear, or a face image representing anger as correct answer data.

In a case where the dangerous event occurrence index value is equal to or greater than a predetermined value, the determination unit 14 determines that a dangerous event has occurred. The determination unit 14 may calculate the dangerous event occurrence index value at a predetermined time interval, and determine that a dangerous event has occurred in a case where the degree of change in the occurrence index value is equal to or more than a predetermined value.

In the above process, an aspect in which a dangerous event occurrence index value is calculated on the basis of a facial condition of the driver in the second captured image has been described, but tire dangerous event occurrence index value may be calculated on the basis of other biological information of the driver. For example, the second calculation unit 16 may calculate the dangerous event occurrence index value on the basis of the driver's voice included in driving status data in response to an instruction from the determination unit 14. The dangerous event occurrence index value based on the driver's voice also has a great value in a case where it is determined that the voice indicates a state of surprise, fear, or anger.

A method of calculating a value indicating the degree of surprise, the degree of fear, or the degree of anger on the basis of a state of the driver's voice included in the driving status data may be any method. As an example, the second calculation unit 16 inputs a voice signal to a calculation model for the dangerous event occurrence index value, calculates the dangerous event occurrence index value indicating the degree of surprise, the degree of fear, or the degree of anger corresponding to an output value thereof, and outputs the dangerous event occurrence index value to the determination unit 14. This calculation model for the dangerous event occurrence index value may also be a calculation model obtained through machine learning with a voice signal representing surprise, a voice signal representing fear, or a voice signal representing anger as correct answer data.

The driving assistance device 1 may calculate the dangerous event occurrence index value on the basis of a visual line, a pulse per unit time, the degree of eyelid opening, and the like of the driver. The visual line or the degree of eyelid opening may be calculated on the basis of an image of the driver's face included in the second captured image. In a case where the biological information is a pulse per unit time, for example, the drive recorder 2 may generate driving status data including a value of a pulse per unit time on the basis of a signal obtained from a pulse sensor attached to the driver and transmit the driving status data to the driving assistance device 1.

For example, the driving assistance device 1 calculates the dangerous event occurrence index value on the basis of the degree of change in a visual line of the driver per unit time. The driving assistance device 1 calculates the dangerous event occurrence index value on the basis of a change in pulse of the driver per unit time. The driving assistance device 1 calculates the dangerous event occurrence index value on the basis of, for example, a difference between the degree of eyelid opening registered in advance and the degree of eyelid opening during driving.

In a case where it is determined that a dangerous event has occurred in at least one of Step S304 and step S305, the determination unit 14 outputs information indicating the occurrence of the dangerous event to the recording unit 17.

In a case where it is determined that the dangerous event has occurred, the recording unit 17 performs the following determination. In other words, the recording unit 17 records occurrence factor information indicating either that the dangerous event is determined as having occurred because an occurrence index value based on driving status sensing data is equal to or greater than a predetermined threshold value, or that the dangerous event is determined as having occurred because an occurrence index value based on biological information is equal to or greater than a predetermined threshold value (step S306).

The recording unit 17 records dangerous event occurrence information including information such as the occurrence factor information, a time at which it is determined the dangerous event has occurred, the ID of the drive recorder 2, and the driver ID in the database 106 (step S307).

According to the above process, it is possible to detect the occurrence of various types of dangerous events. It is possible to record information regarding the occurrence of a dangerous event. More specifically, it is possible to detect chronic rough driving (driving that the driver is unaware of and that makes the driver a candidate driving dangerously) and record information regarding the driving.

The feedback information generation unit 18 generates feedback information by using the recorded dangerous event occurrence information (step S308). The feedback information may be a list of position information where the dangerous event has occurred, the type of dangerous event, a value of each sensor indicated by sensing information, and the like for each driver ID. The feedback information may include an upload image captured at a time at which the dangerous event occurred.

In a case where it is determined that the dangerous event has occurred because the occurrence index value based on the biological information is equal to or greater than the predetermined threshold value, the feedback information may include a value (occurrence index value) indicating the degree of surprise, the degree of fear, or the degree of anger that is determined on the basis of a facial condition of the driver included in tire second captured image. The feedback information may be map data in which an icon indicating danger is displayed in position information included in all dangerous event occurrence information.

The feedback information generation unit 18 outputs the feedback information to the output unit 10. The output unit 19 transmits the feedback information to a predetermined output destination device (step S309).

Figure 9:
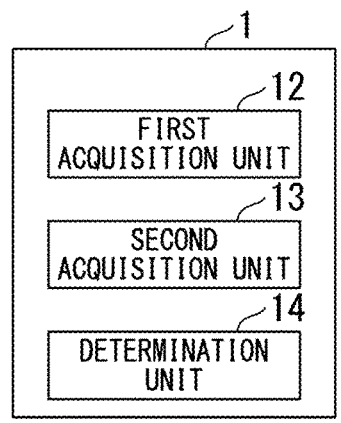
FIG. 9 is a diagram illustrating a minimum configuration of the driving assistance device according to the present embodiment.

FIG. 9 is a diagram illustrating a minimum configuration of the driving assistance device.

As illustrated in FIG. 9, the driving assistance device 1 includes at least the first acquisition unit (first acquisition means) 12, the second acquisition unit (second acquisition means) 13, and the determination unit (determination means) 14.

The first acquisition unit 12 acquires driving status sensing data of the vehicle 20 from a driving status sensing device such as the drive recorder 2 provided in the vehicle 20.

The second acquisition unit 13 acquires biological information regarding a biological change of the driver of the vehicle 20.

The determination unit 14 determines whether or not a dangerous event has occurred on the basis of a dangerous event occurrence index value (first occurrence index value) that is a value corresponding to the driving status sensing data and a dangerous event occurrence index value (second occurrence index value) that is a value corresponding to the biological information regarding a biological change of the driver.

The driving assistance device 1 or the control device 24 of the drive recorder 2 has a computer system therein. The above-described processing procedures are stored on a computer-readable recording medium in a program form, and the processes are performed by a computer reading and executing the program.

The program may be a program for realizing some of the above-described functions. The program may be a so-called difference file (difference program) that can realize the functions in combination with a program already recorded in the computer system.

Priority is claimed on Japanese Patent Application No. 2018-232877, filed Dec. 12, 2018, the content of which is incorporated herein by reference.

INDUSTRIAL APPLICABILITY

According to the present invention, it is possible to detect the occurrence of various types of dangerous events.

REFERENCE SIGNS LIST

1 Driving assistance device
2 Drive recorder
11 Control unit
12 First acquisition unit
13 Second acquisition unit
14 Determination unit
15 First calculation unit
16 Second calculation unit
17 Recording unit
18 Feedback information generation unit
19 Output unit
21 Sensor
22 Communication device
23 Camera
24 Control device
25 Storage device
211 Acceleration sensor
212 Sound detection sensor
213 GPS sensor
241 Vehicle information acquisition unit
242 Position information acquisition unit
243 Acceleration information acquisition unit
244 Event detection unit
245 Upload image generation unit
246 Driving status data transmission unit 247 Event data transmission unit
248 Image transmission unit

What is claimed is:

1. A driving assistance device comprising:
at least one memory configured to store instructions; and
at least one processor configured to execute the instructions to:
acquire driving status sensing data of a vehicle from a driving status sensing device provided in the vehicle;
acquire a captured image of a face of a driver of the vehicle; and
determine occurrence of a dangerous event on the basis of a first occurrence index value for a dangerous event that is a value corresponding to the driving status sensing data,
wherein the at least one processor is further configured to execute the instructions to:
determine that the dangerous event has occurred when the first occurrence index value is equal to or greater than a predetermined first threshold value; and
determine, in a case where the first occurrence index value is smaller than the predetermined first threshold value, that the dangerous event has occurred when a second occurrence index value, which is a value calculated based on a facial condition of the acquired captured image of the driver, is equal to or greater than a predetermined second threshold value.

2. The driving assistance device according to claim 1, wherein the at least one processor is further configured to execute the instructions to:
record, in a case where it is determined that the dangerous event has occurred, occurrence factor information indicating either that the dangerous event has occurred is determined because the first occurrence index value is equal to or greater than the predetermined first threshold value, or that the dangerous event has occurred is determined because the second occurrence index value is equal to or greater than the predetermined second threshold value.

3. The driving assistance device according to claim 2, wherein the at least one processor is further configured to execute the instructions to:
generate feedback information including at least identification information of the driver and the occurrence factor information.

4. The driving assistance device according to claim 1, wherein the at least one processor is further configured to execute the instructions to:
calculate the second occurrence index value, which indicates at least one of a degree of surprise, a degree of fear, or a degree of anger, on the basis of the facial condition of the captured image.

5. The driving assistance device according to claim 1, wherein the at least one processor is further configured to execute the instructions to:
acquire an utterance of the driver; and
calculate the second occurrence index value, which indicates at least one of a degree of surprise, a degree of fear, or a degree of anger, on the basis of a state of the acquired utterance.

6. The driving assistance device according to claim 1, wherein the at least one processor is further configured to execute the instructions to:
acquire a result of detection of the dangerous event on the vehicle; and
determine the occurrence of the dangerous event on the basis of the acquired result of the detection of the dangerous event, the first occurrence index value for the dangerous event that is the value corresponding to the driving status sensing data, and the second occurrence index value that is the value calculated based on the facial condition of the driver.

7. The driving assistance device according to claim 1, wherein
the first occurrence index value used for detecting the dangerous event and the second occurrence index value used for determining the occurrence of the dangerous event are different from each other.

8. A driving assistance method comprising:
acquiring driving status sensing data of a vehicle from a driving status sensing device provided in the vehicle;
acquiring a captured image of a face of a driver of the vehicle; and
determining occurrence of a dangerous event on the basis of a first occurrence index value for a dangerous event that is a value corresponding to the driving status sensing data,
wherein the determining includes:
determining that the dangerous event has occurred when the first occurrence index value is equal to or greater than a predetermined first threshold value; and
determining, in a case where the first occurrence index value is smaller than the predetermined first threshold value, that the dangerous event has occurred when a second occurrence index value, which is a value calculated based on a facial condition of the acquired captured image of the driver, is equal to or greater than a predetermined second threshold value.

9. A non-transitory computer-readable storage medium storing a program causing a computer of a driving assistance device to execute processes of:
acquiring driving status sensing data of a vehicle from a driving status sensing device provided in the vehicle;
acquiring a captured image of a face of a driver of the vehicle; and
determining occurrence of a dangerous event on the basis of a first occurrence index value for a dangerous event that is a value corresponding to the driving status sensing data,
wherein the determining includes:
determining that the dangerous event has occurred when the first occurrence index value is equal to or greater than a predetermined first threshold value; and
determining, in a case where the first occurrence index value is smaller than the predetermined first threshold value, that the dangerous event has occurred when a second occurrence index value, which is a value calculated based on a facial condition of the acquired captured image of the driver, is equal to or greater than a predetermined second threshold value.

* * * * *